(12) United States Patent
Ritter et al.

(10) Patent No.: US 12,541,533 B2
(45) Date of Patent: *Feb. 3, 2026

(54) DATA SYNCHRONIZATION ERROR RESOLUTION

(71) Applicant: SAP SE, Walldorf (DE)

(72) Inventors: Gerd Ritter, Heidelberg (DE); Rene Gross, Heidelberg (DE); Tim Kornmann, Reilingen (DE)

(73) Assignee: SAP SE, Walldorf (DE)

( * ) Notice: Subject to any disclaimer, the term of this patent is extended or adjusted under 35 U.S.C. 154(b) by 920 days.

This patent is subject to a terminal disclaimer.

(21) Appl. No.: 17/740,835

(22) Filed: May 10, 2022

(65) Prior Publication Data

US 2022/0269695 A1 Aug. 25, 2022

Related U.S. Application Data

(63) Continuation of application No. 14/977,487, filed on Dec. 21, 2015, now Pat. No. 11,360,997.

(51) Int. Cl.
*G06F 16/27* (2019.01)
*G06F 16/23* (2019.01)

(52) U.S. Cl.
CPC ........ *G06F 16/273* (2019.01); *G06F 16/2358* (2019.01); *G06F 16/2365* (2019.01); *G06F 16/2372* (2019.01)

(58) Field of Classification Search
CPC .............. G06F 16/273; G06F 16/2358; G06F 16/2365; G06F 16/2372

(Continued)

(56) References Cited

U.S. PATENT DOCUMENTS 5,884,325 A * 3/1999 Bauer ................ G06F 16/273
705/40
7,533,135 B2 5/2009 Klein et al.
(Continued)

OTHER PUBLICATIONS

Doron, Eyal, "Troubleshooting Outlook Synchronization Problems", downloaded from http://o365info.com/troubleshooting-outlook-synchronization/ on Dec. 14, 2015, 58 pages.

(Continued)

*Primary Examiner* — Pierre Vital
*Assistant Examiner* — Andrew N Ho
(74) *Attorney, Agent, or Firm* — Klarquist Sparkman, LLP

(57) ABSTRACT

A synchronization protocol is provided that can be used to resolve synchronization errors encountered while trying to synchronize versions of data objects between a client device and a remote computing system. The protocol includes a client device, in an offline processing mode, handling user interface ("UI") manipulation actions on one or more UI elements of one or more UI screens. The handling of the UI manipulation actions modifies or creates a local version of a data object stored on the client device. The UI manipulation actions are stored by the client device and sent to the remote computing system. The client device receives a synchronization error notification from the remote computing system. After receiving the notification, the client device displays, in one of the UI screens, the local version of the data object and one or more indications of a synchronization error.

20 Claims, 9 Drawing Sheets

(58) Field of Classification Search
USPC .......................................................... 707/615
See application file for complete search history.

(56) References Cited

U.S. PATENT DOCUMENTS

| | | | |
|---|---|---|---|
| 7,730,056 B2 | 6/2010 | Kaiser et al. | |
| 7,808,480 B2 | 10/2010 | Gross | |
| 7,844,912 B2 | 11/2010 | Kornmann | |
| 8,069,144 B2* | 11/2011 | Quinlan | G06F 16/273 |
| | | | 709/224 |
| 8,099,661 B2 | 1/2012 | Ritter | |
| 8,156,078 B2* | 4/2012 | Tsinman | G06F 16/273 |
| | | | 707/622 |
| 8,264,460 B2 | 9/2012 | Gross | |
| 8,396,827 B2 | 3/2013 | Gross et al. | |
| 8,606,723 B2 | 12/2013 | Seubert et al. | |
| 8,655,756 B2 | 2/2014 | Seubert et al. | |
| 8,689,119 B2 | 4/2014 | Ritter et al. | |
| 8,694,397 B2 | 4/2014 | Seubert et al. | |
| 8,706,804 B2 | 4/2014 | Kornmann et al. | |
| 8,893,031 B2 | 11/2014 | Kornmann et al. | |
| 9,020,973 B2 | 4/2015 | Stumpf et al. | |
| 9,032,001 B2 | 5/2015 | Stumpf et al. | |
| 9,053,445 B2 | 6/2015 | Brunswig et al. | |
| 9,072,798 B2 | 7/2015 | Ritter et al. | |
| 9,158,932 B2 | 10/2015 | Ritter et al. | |
| 9,165,087 B2 | 10/2015 | Gross | |
| 2003/0159136 A1* | 8/2003 | Huang | G06F 16/273 |
| | | | 707/999.01 |
| 2003/0233383 A1 | 12/2003 | Koskimies | |
| 2005/0028083 A1 | 2/2005 | Kircher et al. | |
| 2005/0033776 A1 | 2/2005 | Kircher et al. | |
| 2005/0102370 A1 | 5/2005 | Lin | |
| 2006/0080338 A1 | 4/2006 | Seubert et al. | |
| 2006/0085336 A1 | 4/2006 | Seubert et al. | |
| 2006/0085450 A1 | 4/2006 | Seubert et al. | |
| 2006/0095447 A1* | 5/2006 | Dickinson | G06F 40/18 |
| 2007/0005552 A1 | 1/2007 | Klein et al. | |
| 2007/0005640 A1 | 1/2007 | Klein et al. | |
| 2007/0005666 A1 | 1/2007 | Klein et al. | |
| 2007/0078992 A1 | 4/2007 | Bloch | |
| 2007/0097076 A1 | 5/2007 | Gross | |
| 2007/0162516 A1 | 7/2007 | Thiel et al. | |
| 2008/0154950 A1 | 6/2008 | Gross | |
| 2008/0155523 A1 | 6/2008 | Kornmann | |
| 2008/0162205 A1 | 7/2008 | Gross | |
| 2008/0162207 A1 | 7/2008 | Gross et al. | |
| 2008/0162415 A1 | 7/2008 | Kaiser et al. | |
| 2008/0162563 A1 | 7/2008 | Gross et al. | |
| 2008/0162616 A1 | 7/2008 | Gross et al. | |
| 2008/0162777 A1 | 7/2008 | Kaiser et al. | |
| 2009/0042156 A1 | 2/2009 | Meckelnburg et al. | |
| 2009/0055434 A1 | 2/2009 | Chasman et al. | |
| 2009/0083566 A1 | 3/2009 | Momenee et al. | |
| 2009/0106455 A1 | 4/2009 | Xu et al. | |
| 2009/0164932 A1 | 6/2009 | Ritter | |
| 2009/0171679 A1 | 7/2009 | Salgado | |
| 2009/0193107 A1* | 7/2009 | Srinivasan | H04L 67/59 |
| | | | 709/223 |
| 2009/0234872 A1 | 9/2009 | Padgett | |
| 2010/0153501 A1 | 6/2010 | Gabriel et al. | |
| 2010/0321296 A1 | 12/2010 | Gross | |
| 2012/0188996 A1 | 7/2012 | Roka | |
| 2012/0290558 A1 | 11/2012 | Gruber | |
| 2013/0031493 A1 | 1/2013 | Ritter et al. | |
| 2013/0111343 A1 | 5/2013 | Ritter et al. | |
| 2013/0111381 A1 | 5/2013 | Ritter et al. | |
| 2013/0138608 A1 | 5/2013 | Smith | |
| 2013/0151571 A1 | 6/2013 | Stumpf et al. | |
| 2013/0151585 A1 | 6/2013 | Kornmann et al. | |
| 2013/0159356 A1 | 6/2013 | Stumpf et al. | |
| 2013/0159909 A1 | 6/2013 | Kornmann et al. | |
| 2013/0166596 A1 | 6/2013 | Stumpf et al. | |
| 2013/0167110 A1 | 6/2013 | Gross et al. | |
| 2013/0212067 A1 | 8/2013 | Piasecki et al. | |
| 2014/0157154 A1 | 6/2014 | Brunswig et al. | |
| 2014/0172918 A1 | 6/2014 | Kornmann et al. | |
| 2014/0201145 A1 | 7/2014 | Dorman | |
| 2014/0337384 A1 | 11/2014 | Ritter et al. | |
| 2014/0372863 A1 | 12/2014 | Ritter et al. | |
| 2016/0342671 A1* | 11/2016 | Leston | G06F 16/273 |
| 2016/0364432 A1* | 12/2016 | Dzikowska | G06F 16/2386 |
| 2017/0177183 A1 | 6/2017 | Ritter et al. | |

OTHER PUBLICATIONS

"How To Configure iPad/iPhone/iTouch Mail Settings to Increase or Reduce the Amount of Emails Displayed on the Device and/or Change Folder Sync Options", downloaded from https://it.sheridancollege.ca/selfhelp/email/iphone-synch-settings.html on Dec. 14, 2015, 3 pages.

"How To Limit Number of Emails on iPhone", downloaded from http://swapmyapp.com/how-to/limit-number-of-emails-on-iphone/ on Dec. 14, 2015, 9 pages.

"Resolving Sync Conflicts: Frequently Asked Questions", downloaded from http://windows.microsoft.com/en-us/windows-vista/resolving-sync-conflicts- frequently-asked- . . . on Dec. 14, 2015, 4 pages.

"SAP Cloud for Customer Integration with SAP On-Premise: ERP, CRM, BW", 2015, 64 pages.

"SAP Cloud for Customer User Guide", 2014, 296 pages.

"Synchronization Error Folders", downloaded from https://support.office.com/en-in/article/Synchronization-error-folders-e591ed91-f90a-4e5d-a0a . . . on Dec. 14, 2015, 3 pages.

"Understanding Sync Errors and Warnings", downloaded from http//windows.microsoft.com/en-us/windows-vista/understanding-sync-errors-and-warnings on Dec. 14, 2015, 4 pages.

Non-Final Office Action for U.S. Appl. No. 14/977,475, dated May 14, 2018, 28 pages.

Response to Office Action for U.S. Appl. No. 14/977,475, filed Aug. 2, 2018, 28 pages.

Final Office Action for U.S. Appl. No. 14/977,475, dated Jan. 23, 2019, 24 pages.

Response to Office Action for U.S. Appl. No. 14/977,475, filed Apr. 19, 2019, 13 pages.

* cited by examiner

New Appointment — 400

!! Start date is later than end date. | Please select start date and time that is earlier than end data and time. — 450 / 455

Subject: — 420
Meeting with new client

Account: — 415

Primary Contact: — 415

All-Day Event:
◯ No

Start Date/Time: — 435
20.11.2017 | 13:30 ∨ — 425

End Date/Time: — 440
19.11.2017 | 14:00 — 430

Priority:
Normal ∨

Owner: — 415
John Doe

Add

Attendees 0

Name | Email | Action

460 — Save ∧   Cancel — 465

FIG. 4

DATA SYNCHRONIZATION ERROR RESOLUTION

CROSS REFERENCE TO RELATED APPLICATIONS

This is a continuation of U.S. patent application Ser. No. 14/977,487, filed Dec. 21, 2015, which application is incorporated herein by reference in its entirety.

FIELD

The present disclosure relates to synchronizing information between computing systems. For example, the present disclosure provides a protocol that may be used to resolve errors arising when synchronizing information between a client device and a remote computing system.

BACKGROUND

Many computing systems allow a user of a client device, such as a desktop computer, a laptop computer, a tablet computer, or a smartphone, to access data that is stored at a remote computing system, or to store data that was newly created or modified at the client device at the remote system. For example, the remote computing system may be a cloud computing system. Cloud computing is the use of hardware and software computing resources that are available in a remote location and accessible over a network, such as the Internet. Users are able to lease, buy, or otherwise reserve these computing resources to perform computations and to store their data. For example, data on a local client device can be copied to the remote cloud resources. Cloud resources can provide a number of advantages, including cost advantages and/or the ability to adapt rapidly to changing computing resource needs.

However, a remote computing system, including cloud resources, may not always be accessible, such as when a user is working offline on a client device. A local version of data can be created or manipulated while the client device is disconnected from the remote computing system, and later sent to the remote computing system when a connection is established. However, errors can arise during this synchronization process. For example, when the data represents a document, changes to the local version of the document, made offline at the client device, can conflict with a remote version of the document stored on the remote computing system, e.g., due to changes made by another user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, the present disclosure provides a synchronization protocol that may be used to resolve synchronization errors encountered while trying to synchronize versions of data objects between a client device and a remote computing system. The protocol includes a client device, in an offline processing mode, handling user interface ("UI") manipulation actions on one or more UI elements of one or more UI screens. The handling of the UI manipulation actions modifies or creates a local version of a data object stored on the client device. The client device is not connected to the remote computing system in the offline processing mode. The plurality of UI manipulation actions are stored by the client device in the offline processing mode. Then, in a synchronization stage, the plurality of UI manipulation actions are sent to the remote computing system. The client device receives a synchronization error notification from the remote computing system. The synchronization error notification indicates a synchronization error between the local version of the data object and a remote version, if any, of the data object stored on the remote computing system. After receiving the synchronization error notification, the client device displays, in one of the one or more UI screens, the local version of the data object and one or more indications of the synchronization error.

In a further embodiment, the present disclosure provides a synchronization protocol that may be used to resolve synchronization errors encountered while trying to synchronize versions of data objects between a client device and a remote computing system. The protocol includes a client device, in an offline processing mode, handling user interface ("UI") manipulation actions on one or more UI elements of one or more UI screens. The handling of the UI manipulation actions modifies or creates a local version of a data object stored on the client device. The client device is not connected to the remote computing system in the offline processing mode. The plurality of UI manipulation actions are stored by the client device in the offline processing mode. Then, in a synchronization stage, the plurality of UI manipulation actions are sent to the remote computing system. The client device receives a synchronization error notification from the remote computing system. The synchronization error notification indicates a synchronization error associated with the UI manipulation actions. After receiving the synchronization error notification, the client device displays, in one of the one or more UI screens, the local version of the data object and one or more indications of the synchronization error.

In another embodiment of a disclosed synchronization protocol that may be used to resolve synchronization errors encountered while trying to synchronize versions of data objects between a client device and a remote computing system, a plurality of recorded UI manipulation actions are received by the remote computing system from the client device. The recorded UI manipulation actions implement a modification or creation of a local version of a data object stored on the client device in an offline processing mode. The plurality of recorded UI manipulation actions are replayed by the remote computing system, which modifies or creates a remote version of the data object (for storage on the remote computing system). The remote computing system determines a synchronization error associated with the UI manipulation actions and sends a synchronization error notification to the client device.

In a further embodiment of a disclosed synchronization protocol that may be used to resolve synchronization errors encountered while trying to synchronize versions of data objects between a client device and a remote computing system, a plurality of recorded UI manipulation actions are received by the remote computing system from the client device. A synchronization error associated with the plurality of UI manipulation actions is determined. A synchronization error notification is sent to the client device by the remote computing system. The plurality of recorded UI manipulation actions are replayed by the remote computing system, so as to modify or create a remote version of the data object (for storage on the remote computing system).

The foregoing and other objects, features, and advantages of the present disclosure will become more apparent from the following detailed description, which proceeds with reference to the accompanying figures.

BRIEF DESCRIPTION OF THE DRAWINGS

FIG. 4 is an example UI screen for resolving a synchronization error in an instance of an appointment.

DETAILED DESCRIPTION

Overview

Figure 1:
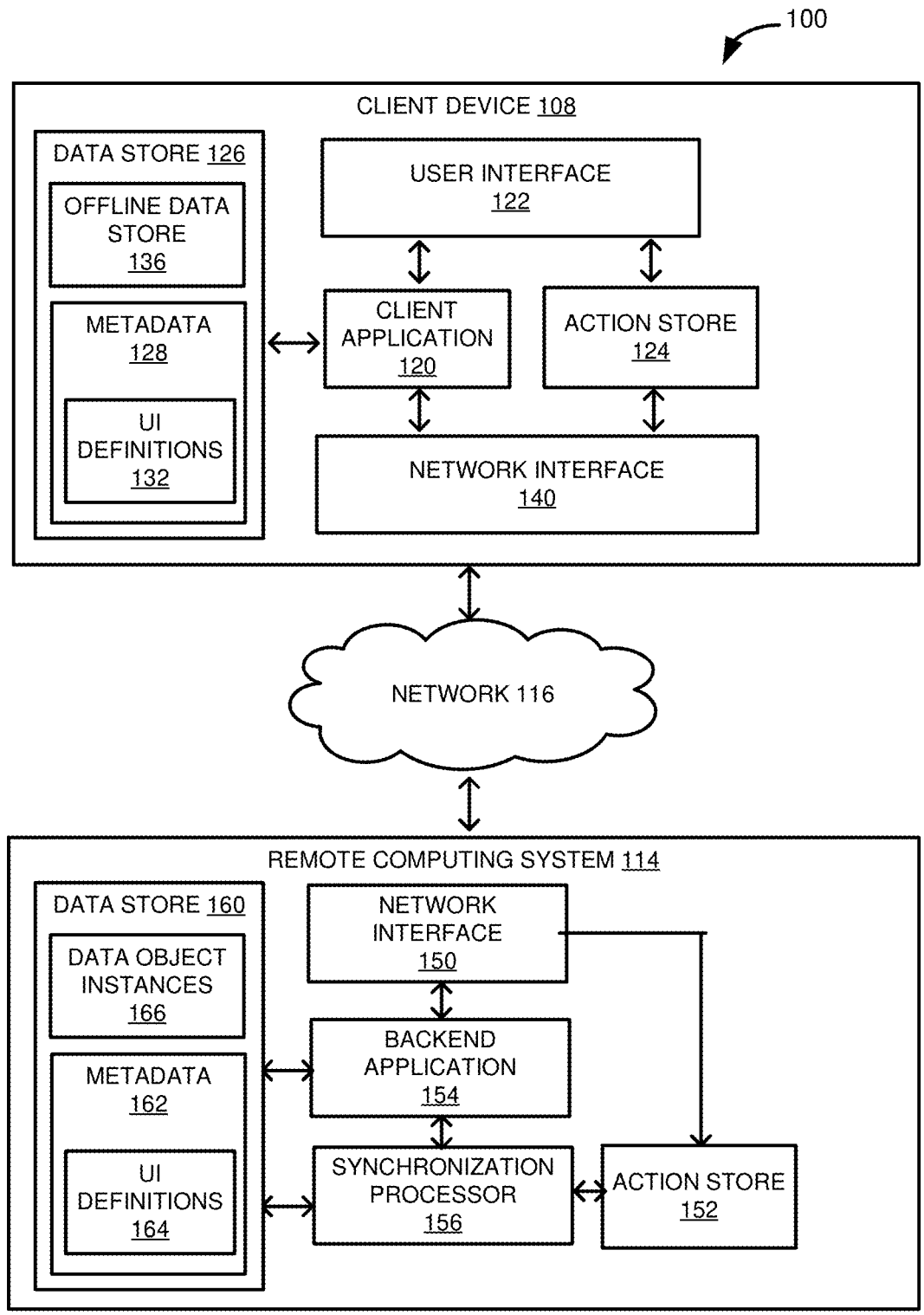
FIG. 1 is a block diagram of an example software architecture for implementing a synchronization protocol according to an embodiment of the present disclosure.

Users, such as users in an organization, may have data, including data objects (such as documents and data objects related to the organization, such as data objects representing accounts, sales orders, sales opportunities, appointments, reports, presentations, word processing documents, etc.), that are stored on one or more client devices and/or on a remote computing system, such as at a cloud storage facility. There can be trade-offs between storing the data and data objects (including individual instances of a data object) at either a client device or at the remote computing system. For example, data and data objects stored on the client device, such as a desktop computer, a laptop computer, a tablet computer, or a mobile phone (such as a smartphone), can be accessible even when the client device is disconnected from the network, and hence the remote computing system, for an "offline" processing mode. Thus, a user on a business trip or working from home can continue to work with data, including accessing, modifying, and creating data (including data object instances of a data object schema) stored locally, even if the client device does not have a network connection. When the client device is reconnected over a network with the remote computing system, data can be transferred to, and optionally synchronized with, the remote computing system. However, errors can arise during the synchronization process. Unless otherwise specified, or the context indicates otherwise, the term "data object" includes instances of the data object. For example, actions modifying or creating a data object may be carried out on an instance of the data object.

Data objects and data, including instances of data objects, stored on a remote computing system can include shared data objects and data, such as instances of the data objects, that may be accessible to multiple users, such as multiple members of an organization. For example, a team of members may be given access to shared data objects and data. Having data objects and instances thereof accessible to the team may foster collaboration among the team, help the team to make better decisions, and increase the availability and accuracy of the available data objects and data, including data object instances. In one example of a remote computing system, a cloud storage facility can be used as a central repository for data objects, such as data object instances and/or datasets, such as those created and/or collected by one user or by multiple users.

When data is created or modified while the client device is disconnected from the remote computing system (that is, in offline processing mode), it can be sent to the remote computing system when a network connection is established with the remote computing system. In some cases, the client's "local" version of the data is checked against a "remote" version of the data stored by the remote computing system, or, if the data is new (such as a new document or appointment), it can be stored by the remote computing system, including after checking whether the data is valid. In some cases, the data version at the remote computing system can be updated to reflect changes made at the client device. The checking, whether in reconciling data versions or analyzing data validity, can identify an error, referred to as a synchronization error, between the versions of data. For example, the remote version of the remote computing system may be locked, such as being locked for modification by another user or locked to prevent further modification of the remote version, or may be otherwise unavailable (such as data relating to an account or contact that is no longer is available or active). In other examples, the remote version of the remote computing system may have been previously modified, such as by another user, with changes that are inconsistent with the changes of the client device's local version of the data.

The client device's local version of data, whether new or modified, may be checked for validity, such as for compliance with rules for data or metadata of data object instances of a particular type of data object (such as a data object having a schema). A synchronization error may be identified, for example, when the local version of data object instance does not include data or metadata for all required fields, including for fields that were added, or marked as required, after the data object instance was created. A synchronization error also may be identified when the local version of data does not comply with rules for a data object instance. For example, an error for an instance of an appointment data object schema may occur when the start date of the appointment is after the end date of the appointment.

The present disclosure provides a synchronization protocol that can facilitate identifying synchronization errors to a user. It can also facilitate the user modifying their original input (on a local version of data in offline processing mode) in order to resolve the synchronization error, such as to complete the synchronization process with the remote computing system.

Example 1—System Implementing a Synchronization Protocol Between a Remote Computing System and a Client Device FIG. 1 is a block diagram of an example software architecture 100 for implementing a synchronization protocol between a client device 108 and a remote computing system 114. The client device 108 and the remote computing system 114 can communicate via a network 116. The remote computing system 114 can be, for example, part of a datacenter of a cloud service provider or a remote server. The cloud service provider can deliver computing and storage capacity as a service to a community of end recipients from a remote location. The cloud service provider can offer a "private cloud environment," where only one organization has access to the cloud, or the cloud service provider can offer a "public cloud environment" or "multi-tenant environment," where a plurality of customers can operate databases independently of each other. End users can access the cloud service provider using networked client devices, such as the client device 108. Those skilled in the art will recognize that the cloud service provider can be described as a "cloud" environment.

The network 116 can include a local area network (LAN), a Wide Area Network (WAN), the Internet, an intranet, a wired network, a wireless network, a cellular network, combinations thereof, or any other network suitable for providing a channel for communication between the remote computing system 114 and the client device 108. It should be appreciated that the network topology illustrated in FIG. 1 has been simplified and that multiple networks and networking devices can be utilized to interconnect the various computing systems disclosed herein. The client device 108 and remote computing system 114 may communicate over the network 116 using any suitable communication protocol. In a specific example, the client device 108 and the remote computing system 114 communicate via the HTTP protocol.

As used herein, the term "send" to a destination entity refer to any way of transmitting or otherwise conveying data within a computer system or between two computer systems, whether the data is directly conveyed or conveyed through one or more intermediate entities. Similarly, the term "receive," such as to receive from an entity, refers to the receipt of data within a computer system or between two computer systems, whether the data is received directly from the computer system of original transmission or received through one or more intermediate entities.

The client device 108 can include various types of clients, such as desktop computers, laptops, netbooks, tablets, and mobile devices (such as smartphones). The client device 108 includes a web browser and/or other client application 120 for facilitating data processing (in an online processing mode or offline processing mode) as well as synchronization between the client device 108 and the remote computing system 114. For example, the client application 120 can be part of a business intelligence software suite for enabling a variety of users to access, transform, and visualize data, and then synchronize the data with the remote computing system 114. The client application 120 can be implemented in any suitable computing language, such as a programming language and/or a markup language. However, in specific examples, features of the client application 120 are specified in languages such as HTML5 and JavaScript, which are interpreted at runtime by a framework or user interface ("UI") engine 122 to present UI elements for the client application 120 and data.

The client application 120 can be used to prepare data from one or more sources, create a visualization of the data, and then display the visualization to a user and/or make the data available for the user to modify or query. The client application 120 may also allow the user to create new data, which may be later transferred to the remote computing system 114. The user may be provided with the ability to interact with the application 120, and in turn the data, with a UI engine 122.

UI manipulation actions received from the client application 120 or UI engine 122 are, in some examples, stored in an action store 124, such as, in some examples, a queue. However, the action store 124 may be implemented in any suitable data structure, or maintained in an unstructured format. The UI manipulation actions in the action store 124 are, in some implementations, stored in an order in which the actions were handled by the client application 120 at the client device 108. In other implementations, the UI manipulation actions are not necessarily stored in an order in which they were handled at the client device 108, but the UI manipulation actions include, or are stored with, other information from which the order may be reconstituted. For example, the UI manipulation actions may be stored with a value indicating an execution order, such as a time the UI manipulation action was handled. In further implementations, the UI manipulation actions are stored in some other manner.

The UI manipulation actions in the action store 124 can include additional information. For instance, the UI manipulation actions may be ordered by (such as being grouped by), or include information regarding, a particular transaction with which all or a portion of the UI manipulation actions are associated. A particular transaction, in some examples, is all of the changes to a particular data object (such as a data object instance) made while the client device 108 was disconnected from the remote computing system 114. In other examples, a particular transaction refers to UI manipulation actions that occurred between when a data object was first requested (such as a request to open a document) and when the data object was committed by the user (such as a document being saved or closed). In other examples, a transaction is a different subset of UI manipulation actions.

In some aspects of the present disclosure, the UI manipulation actions are received by the action store 124 directly from the UI engine 122. In other aspects, the UI manipulation actions are received by the action store 124 from some other source. For example, the UI manipulation actions may be sent to the action store 124 after being processed by the client application 120.

UI manipulation actions stored in the action store 124 indicate, for example, actuation, selection, or other manipulation of one or more UI elements of the client application 120, as rendered with the UI engine 122 at the client device. The UI manipulation actions can originate from input provided by, or action taken by, a user. User input or actions can include data entered by the user, including changes to existing data. Changes to existing data can include deleting data. UI manipulation actions can also include commands issued to the client application 120 through the UI engine 122. For example, UI manipulation actions can include navigational actions, such as switching between, opening, or closing tabs or windows in an application (such as a web browser). UI manipulation actions can also include opening, closing, adding, saving, and deleting data objects (such as orders, reports, documents, and appointments), including individual instances of a data object schema. UI manipulation actions may also include launching or closing applications, or selecting various tasks made available in the UI engine 122, such as spell checking a document or sorting data in a table. In various implementations, the UI manipulation actions stored in the action store 124 include additional types of UI manipulation actions, or a limited subset of the described UI manipulation actions. In at least certain implementations, UI manipulation actions exclude actions that do not result in a change in data or an action being taken on a UI element rendered at the client device, such as actions that move a pointer about the display (such as moving a pointer with a mouse, track pad, touch screen, stylus, or similar input device) without changing any UI element of the client application 120.

The client device 108 may include a data store 126, such as a database, that stores metadata 128, which can include metadata for a data object schema. The metadata 128, including the metadata of the data object schema, can include UI metadata 132, which can, for example, specify UI elements of the client application 120, including UI data associated with a particular data object schema. The metadata store 128 can include other types of metadata, including other metadata associated with a data object schema, such as other properties, including data members and methods, of the data object schema. In specific implementations, the data object schema may be specified in a markup language, such as XML.

The data object schema may specify various properties of the data object and instances thereof, including how data for the data object is maintained and ways of interacting with the data, including methods for accessing, modifying, and visualizing the data. Stated another way, the data object schema can represent, and define, a particular class or type of data object, with data object instances representing particular instances of the type or class. Underlying data for individual data object instances may also be stored in the data store 126, such as in an offline data store 136 (for data objects accessible at the client device 108 in an offline processing mode). In other examples, the data store 126 may store other types of data, or need not store data of data object instances.

In some cases, the data for the data object instances includes metadata. The metadata associated the data object instances can include information such as the original source or creator of the data object instance, the last user to modify the data object instance, the date the data object instance was created, the date the data object instance was last modified, and the identity of the last user to modify the data object instance. In some examples, the metadata is maintained with the data for the data object instance in the offline data store 136. In other examples, the metadata for the data object instances in maintained elsewhere (or, optionally, in addition to the offline data store 136), such as in the metadata store 128.

As an example, a particular data object schema (type, or class) may be a sales order. The data object schema may specify UI elements, with metadata stored in the UI metadata store 132, associated with a sales order, such as defining queries that may be run against one or more instances of the sales order data object type (including its data or metadata), ways of manipulating sales order instances (including generating or modifying metadata regarding one or more sales order instances or manipulating underlying data of one or more sales order instances), and ways of displaying or visualizing one or more sales order instances (including their data or metadata), such as reports or summaries.

The data object types may include one or more predefined types. In at least certain aspects of the present disclosure, additional data object schemas may be created and used with the disclosed synchronization protocol. That is, the present disclosure is not, in such implementations, limited to a set of predefined data object schemas.

In particular implementations, for an offline processing mode, the client application 120, such as in response to user input received through the UI engine 122, determines appropriate data object instances to access and requests and receives the underlying data for the data object instances from the offline data store 136. The client application 120 parses the data object schema and data from the offline data store 136 to take actions requested by a user through the UI engine 122, such as requests to query, edit, view, or manipulate data (including metadata) associated with the data object schema or the data object instances. For example, continuing the sales order example, the client application 120 may determine the relevant sales order instances, fetch the relevant data from the offline data store 136, and parse the data object schema, such as in displaying a report, summary, or one or more instances of a data object schema to the user. In another example, a user makes a request to create a new instance of the sales order data object schema. The appropriate UI for entering a new sales order is retrieved from the metadata store and displayed to the user through the UI engine 122. As described above, at least a portion of the user's actions during these processes is sent to, and stored by, the action store 124.

Similarly, for online use, the client application 120, such as in response to user input received through the UI engine 122, determines appropriate data object instances to access and requests and receives the underlying data for the data object instances from the data store 160 at the remote computing system, which stores corresponding data object schema. The client application 120 parses the data object schema and data from the data store 160 to take actions requested by a user through the UI engine 122, such as requests to query, edit, view, and manipulate data (including metadata) associated with the data object schema or the data object instances.

The client application 120 and the action store 124 are in communication with a network interface 140. The network interface 140 facilitates communication over the network 116, including with the remote computing system 140. The network interface 140 may, in some examples, carry out actions such as formatting data sent and received over the network 116, and routing information received over the network 116 to the appropriate component of the client device 108. In some implementations, the functions of the network interface may be implemented in the client application 120 or another component of the client device 108.

Even if it operates mostly in an offline processing mode, the client device 108 is periodically synchronized with the remote computing system 114. The synchronization may occur at predetermined intervals (such as hourly, daily, weekly, or monthly), at the request of the client device 108 (such as in response to user input), or through a request initiated by the remote computing system 114 (including in response to user input, such as by an administrator, or in response to criteria defined on the remote computing system 114). The client device 108 and/or remote computing system 114 can include a scheduling component for determining whether it is time to synchronize (or otherwise update) information in the data store 126 of the client device 108 with information in the data store 160 of the remote computing system 114. For example, the scheduling component can compare the current day of the week, date, and time to a time and interval specified in an update schedule. If the current time matches the time and interval specified in the update schedule, the disclosed synchronization/download process can be initiated. As a specific example, a current date and time of Monday, January 1 at 6:00 a.m., can match a daily scheduled update for 6:00 a.m., a weekly scheduled update for Mondays at 6:00 a.m., and a monthly scheduled update for the first of each month at 6:00 a.m. The scheduling component can execute as part of the client application 120 or the scheduling component can run as a background process or daemon so that synchronization/downloading can take place even if the client application 120 is not currently executing.

In other implementations, synchronization is initiated in a different way, such as in response to user action on the client device 108. For example, a user may specifically request synchronization, or synchronization may occur as part of other user-initiated actions. In another example, synchronization is initiated when a connection is established between the client device 108 and the remote computing system 114.

The remote computing system 114 includes a network interface 150. The network interface 150 facilitates communication over the network 116, including with the client device 108. The network interface 150 may, in some examples, carry out actions such as formatting data sent and received over the network 116, and routing information received over the network 116 to the appropriate component of the remote computing system 114. In some implementations, the network interface 150 is omitted. For example, the functions of the network interface 150 may be implemented by another component of the remote computing system 114.

The remote computing system 114 includes an action store 152. The action store 152 receives and stores UI manipulation actions received from the client device 108 over the network 116, such as receiving the UI manipulation actions from the network interface 150. However, in other implementations, the action store 152 need not communicate with the network interface 150, and may receive UI manipulation actions stored on the client device 108 from another component of the remote computing system 114.

In certain implementations, the action store 152 stores UI manipulation actions in the same manner, including order or grouping, as they were stored in the action store 124 of the client device 108 (and handled at the client device 108). In other implementations, the UI manipulation actions are stored at the action store 152 in a different manner. However, the UI manipulation actions typically are stored in a manner that allows the UI manipulation actions to be replayed on the remote computing system 114 in the same order in which they occurred at the client device 108, such as being stored in the order in which they occurred, or being stored with information sufficient to reconstitute the order of occurrence. As described for the action store 124, the UI manipulation actions in the action store 152 may be grouped, or stored with information indicating a grouping.

The remote computing system 114 includes a backend application 154. In a specific example, the backend application 154 is an application server. The backend application 154, in some examples, such as when there is an active connection between the client device 108 and the remote computing system 114, processes, or assists the client application 120 in processing, UI manipulation actions received through the UI engine 122 for an online processing mode. For example, UI manipulation actions may be forwarded to the backend application 154, which can execute them and send appropriate data to be presented to the user, such as through the UI engine 122 via the client application 120.

In other examples, to synchronize after offline processing by the client device, the backend application 154 processes stored UI manipulation actions in the action store 152. A synchronization processor 156 may be used to facilitate this process, such as receiving stored UI manipulation actions in the action store 152 and sending them to the backend application 154 for replay. In some examples, the synchronization processor 156 is responsible for maintaining an order in which the UI manipulation actions occurred at the client device 108. For example, the synchronization processor 156 may retrieve the actions in an order, or may use information associated with the UI manipulation actions, such as an execution time, to reconstitute the execution order.

The backend application 154 and the synchronization processor 156 are in communication with a data store 160. In some examples, the data store 160 is a database. The data store 160 includes a metadata store 162. The metadata store 162 may be used to specify UI elements, for example, with UI metadata 164, including UI metadata associated with one or more data object schemas. The metadata store 162 can store other types of metadata, including other metadata associated with a data object schema, or with individual instances of a data object schema.

The data store 160 also stores data object instance data 166 regarding data object instances of one or more data object schemas. Metadata associated with the data object instances may also be stored in the data object instances store 166, or may be stored (including in addition to being stored in the data object instance store 166) in the metadata store 162. The data store 160 may also be used to store other types of data, or need not include information regarding data object instances.

As described above, the data object instances or other data stored in the data store 160 can typically be shared between multiple client devices 108, with each of the multiple client devices having a local version of a data object. Alternatively, or additionally, the data of the data store 160 can be used for other purposes. For example, a data object instance of the data store 160 may serve as a master copy of the instance for one or more users, can be used as a backup copy should the data object instance become deleted, corrupted, or otherwise unavailable at the client device 108, or allow the data object instance to provided to a user on multiple client devices 108 of the user. For example, a user may create a data object instance, such as an appointment, on a mobile phone, and have the appointment be available at their desktop computer by having the desktop computer receive a copy of the appointment from the remote computing system 114.

Typically, for offline processing, a copy of a data object instance (including its associated metadata, if any) is sent to a client device 108. Changes made to the data object instance can be returned to the remote computing system 114 and, if desired, applied to the "remote" version of the data object instance stored in the data store 156. The remote computing system 114 can include rules for synchronizing changes made by multiple users to the same data object instance.

Information stored at the client device 108 or the remote computing system 114, including in the data store 126 of the client device 108 or the data store 160 of the remote computing system 114, can be stored encrypted or unencrypted in memory, a storage device, or a combination of the two. The memory can be tangible memory, such as volatile memory (e.g., registers, cache, RAM), non-volatile memory (e.g., ROM, EEPROM, flash memory, etc.), or some combination of the two, accessible by the client device 108 or the remote computing system 114. The storage can be removable or non-removable, such as magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the client device 108 or the remote computing system 114.

It should be appreciated that the client device 108 and the remote computing system 114 may be configured differently. For example, the client device 108 and the remote computing system 114 need not include a discrete data store 126, 160. Also, the data and metadata associated with a data object instance may be stored in a different manner.

In addition, as noted above, the handling of actions through the client application 120 may differ depending on whether the client device 108 is operating in online processing mode or offline processing mode. For example, when in offline processing mode, metadata in the metadata store 128 may be interpreted entirely in the client application 120 (other otherwise locally to the client device 108). In some implementations, when in online processing mode, interpreting can occur both on the remote computing system 114 and on the local computing device 108, for example, in the client application 120 using communications over the network 116 and the interpreting by the backend application 154. Similarly, when in online processing mode, data can be provided by the data store 160 of the remote computing system 114 instead of, or in addition to, the offline data store 136 of the client device 108.

During synchronization after operation in the offline processing mode, the client device 108 sends the remote computing system 114 information regarding data added or changed by the user in the offline processing mode. In some examples, the client device 108 sends the remote computing system 114 all or a portion of the new or changed data. In other examples, the client device 108 sends the remote computing system 114 the stored UI manipulation actions in the action store 124. The remote computing system 114 can apply (replay) the stored UI manipulation actions, such as using the synchronization processor 156, to recreate the version of the data stored on the client device 108.

The remote computing system 114 may determine when a synchronization error has occurred, such as when changes cannot be applied because data is unavailable at the remote computing system 114, or when the changes do not comply with data rules, such as rules for required data and rules regarding data formatting.

When a synchronization error occurs, the remote computing system sends an error notification to the client device 108, where it may be presented to the user through the UI engine 122. In a specific example, the user is presented with a synchronization log. The synchronization log can indicate whether a particular synchronization event was successful. If the synchronization was unsuccessful, the user may be provided with an option to remedy the synchronization error or obtain more information regarding the synchronization error. For example, the user may be provided with an option to view details associated with a particular synchronization event.

Each synchronization event may include one or more synchronization actions. For example, a synchronization event may attempt to synchronize changes to a plurality of data object instances (including creating new instances). It is possible that a synchronization action for one data object instance may be successful, while a synchronization action for another data object instance may have errors. When the user is provided with details regarding a synchronization event, such as a particular synchronization event of a synchronization log, or present with a list of actions occurring in a particular synchronization event, the user may be provided with an option to remedy the synchronization error.

When the user chooses to remedy the synchronization error, the user is presented with a UI screen having UI elements. In particular implementations, the UI screen is the same UI screen, or essentially the same UI screen, in which the user originally modified or created the data. For example, if the user modified a sales order, the sales order may have one or more UI screens associated with creating or editing sales order information. The same UI screen or UI screens used to create or modify the sales order initially are presented to the user again in allowing the user to remedy the synchronization error.

In further implementations, the UI screen includes information previously entered by the user, including data for which synchronization was attempted. In this way, in remedying a synchronization error, the user is presented with the error in the same context in which the user created or modified the data. In addition, the user need not reenter previously entered information, as such information is pre-populated to the UI screen. The user need only correct the source of the synchronization error.

In some cases, when the user elects to remedy the synchronization error, the remote computing system 114 replays the appropriate UI manipulation actions of the action store 152. For example, the UI manipulation actions may be applied to a version of the data stored by the remote computing system 114 or used to create new data. The updated version or new data may then be displayed to the user as described above. In other cases, the UI manipulation actions may have already been replayed as part of the synchronization error detection process, in which case the UI manipulation actions can be replayed again and sent to the client device 108, or the data from the previous replay of UI manipulation actions can be sent to the client device 108 for display to the user.

According to some implementations, the UI screen presented to allow a user to correct a synchronization error may include a synchronization error message. The synchronization error message may include, for example, information regarding the synchronization error or information on how to remedy the synchronization error. The UI screen may also highlight or otherwise call attention to data corresponding to the source of a synchronization error, such as by highlighting an area of the UI screen (such as a data field or data) or presenting an error icon proximate the source of the error.

The user, in some scenarios, may choose to provide additional user input to remedy the synchronization error, resulting in one or more additional UI manipulation actions. For example, the user may modify data to comply with data rules or supply missing, required data. The user may then retry the synchronization with the additional UI manipulation action(s). In other implementations, such as when data at the remote computing system 114 was unavailable when synchronization was attempted, the user may choose to retry the synchronization without modifying or adding data, in case the data at the remote computing system is now available. The user may also choose to discard the data that was attempted to be synchronized, such as reverting to a prior version of the data or ceasing to attempt to create a new data object instance, for example.

The disclosed protocol, in at least certain implementations, can provide one or more advantages. The user can be presented with a synchronization error in the context in which the error arose, which can make it easier for the user to identify and correct the error. The presentation can include information to help the user identify and correct the error. The presentation to the user can also include data previously entered or viewed by the user, such that the user does not have to re-enter data, including data that may not be associated with the synchronization error.

Implementations of the disclosed protocol employing replay of stored UI manipulation actions from offline processing can be advantageous because the replay at the remote computing system can be carried out in the same manner as if the user were providing the UI manipulation actions while online, in real time. Thus, the synchronization protocol can avoid the need for different protocols for online interaction and synchronization of offline changes, or the need to map between different protocols. Because the synchronization error resolution involves replay of stored UI manipulation actions, it can also be applied to a variety of different types of data, including newly created data object schemas, rather than being limited to a predetermined type or types of data. In addition, because UI manipulation actions are sent, rather than the underlying data (or metadata), the disclosed protocol can, at least in certain scenarios, reduce the amount of data sent over the network 116.

Example 2—Example Synchronization Log Screen

Figure 2:
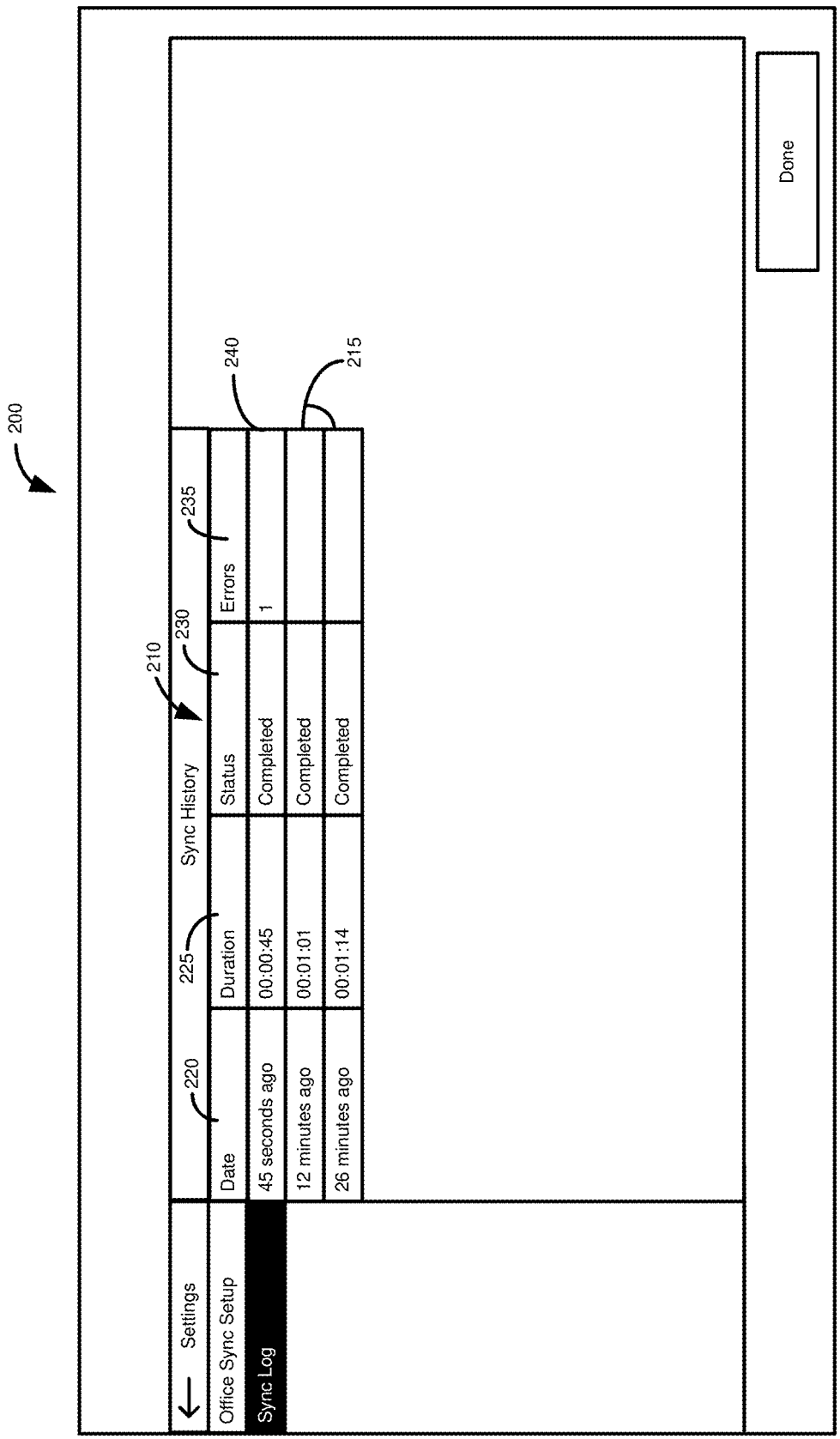
FIG. 2 is an example UI screen of a client device for displaying a synchronization log.

FIG. 2 is an example UI screen 200 of a synchronization log. The screen 200 includes a synchronization history 210, summarizing a plurality of synchronization events 215. For example, the history 210 may display a predetermined number of synchronization events, typically listed in reverse chronological order. However, the synchronization history 210 can include a different number of synchronization events, which may also be presented in a different order or in a different manner.

For each synchronization event 215, the synchronization history 210 provides information regarding the synchronization event. The information can include information relating to the date 220 the synchronization event was attempted, which can be an absolute date, or a time relative to a current date and time (such as a certain number of hours, minutes, or seconds from the present time). The synchronization history 210 can also provide information regarding the duration 225 of the synchronization, or how long the synchronization process took to occur. The synchronization history 210 can also indicate the status 230 of the synchronization event. For example, the status may be completed, failed, aborted, pending, in process, or another status. An error field 235 may be used to indicate to the user whether any errors were encountered for the synchronization process. For example, synchronization event 240 has a status of completed, but with 1 error. By selecting a particular synchronization event 215, a user may be presented with additional information regarding the synchronization, including any errors.

In other examples, the synchronization history 210, and screen 200, can include more or fewer fields than fields 220, 225, 230, 235.

Example 3—Example Synchronization Action Summary Screen

Figure 3:
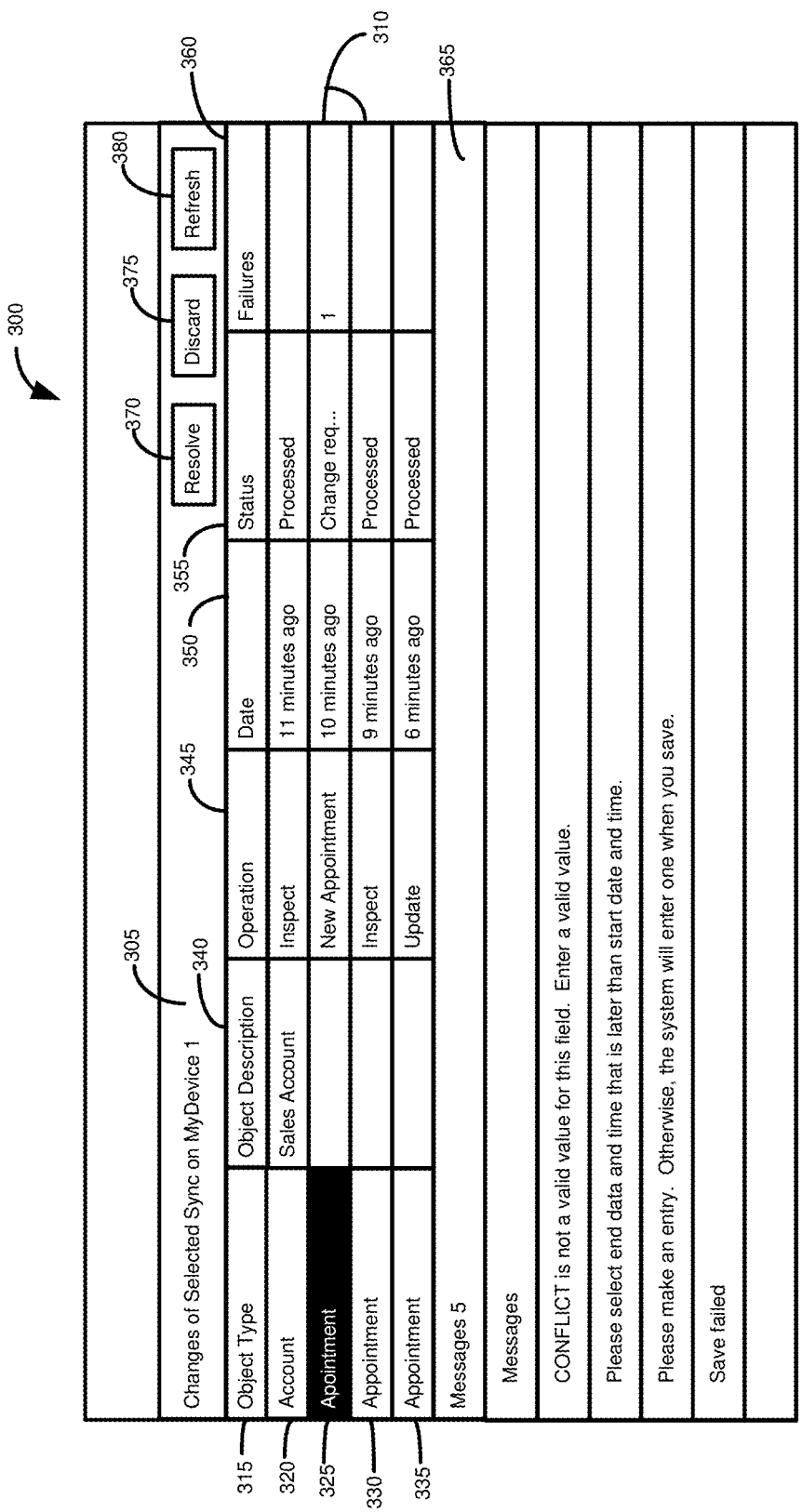
FIG. 3 is an example UI screen of a client device summarizing synchronization actions occurring during a synchronization event.

FIG. 3 is an example UI screen 300 illustrating details of a synchronization event, such as the synchronization event 240 of FIG. 2.

The screen 300 includes a title 305, which can include information such as an identity of the particular synchronization event being displayed, an identity of the client device being synchronized, or an identity of the remote computing system with which the client device is being synchronized.

The screen 300 displays individual synchronization actions 310 that occurred during the synchronization event being displayed. Each action 310 can include a display of information related to the type of object 315 associated with the synchronization action 310, such as a data object schema of which the object is an instance of. For example, synchronization action 320 is associated with an instance of the "account" data object schema, while synchronization actions 325, 330, 335 are associated with instances of the "appointment" data object schema.

The actions 310 may, optionally, include an additional description 340 of the object type 315. For example, synchronization action 320 includes information indicating that the object type 315 has a subtype 340 of "Sales Account."

An operation field 345 provides information regarding the UI manipulation action(s) that were synchronized, or attempted to be synchronized, with the remote computing system. For example, the operation field 345 for synchronization actions 320, 330 indicates that the data object instances were viewed on the client device. The synchronization of actions 320, 330 may include modifying "last viewed" metadata associated with those particular data object instances.

Synchronization action 335 indicates that the operation 345 was to update an instance of the appointment data object schema. The synchronization action 335 may involve making corresponding updates to a version of the data object instance stored on the remote computing system. The operation 345 of synchronization action 325 indicates that a new instance of the appointment data object schema was created, which may involve creating a new data object instance on the remote computing system.

A date field 350 provides information about when the UI manipulation action associated with the synchronization action 310 was carried out on the client device, such as a date a group of UI manipulation actions associated with the synchronization action was committed (such when a data object instance was saved or closed). The information in the date field 350 may include an absolute date (and time), or a relative date, such as a number of second, minutes, or hours from the time the user selected to display the screen 300.

For each of the synchronization actions 310, a status field 355 is provided. The status field 355 may be used to indicate the synchronization status of individual synchronization actions 310 within a particular synchronization event. For example, as shown for synchronization actions 320, 330, 335, the respective status fields 355 indicate that the synchronization action 310 was successfully processed, and corresponding UI manipulation actions were successfully carried out at the remote computing system. The status field 355 for synchronization action 325 indicates that an error occurred in applying the UI manipulation actions at the remote computing system, and that corrective action is required (e.g., through one or more additional UI manipulation actions). Other status messages that may be displayed in the status field 355 include that a synchronization action failed, was blocked, or was queued for later execution.

If any failures, or errors, were encountered during the synchronization attempt for a synchronization action 310, they can be indicated in field 360. In some examples, the failure field 360 indicates the number of failures (or errors) that occurred during the attempted synchronization of the synchronization action 310.

In addition to indicating that a failure or error occurred for a particular synchronization action 310 using the failure field 360, or the status of a synchronization action 310 using the status field 355, the screen 300 can display messages to a user in message field 365. For example, messages can include a description of the nature of a synchronization error, such as a description of the failure or error indicated in failure field 360. In some implementations, the message displayed in the message field 365 may relate to a selected synchronization action 310, such as synchronization 325. In other implementations, the message field 365 may related to the synchronization event, overall.

In the specific example of FIG. 3, the message in the message field 365 instructs the user that the synchronization failure was due to having invalid start and end values for the appointment data object instance. The user is also informed that the system will attempt to correct the failure if the user does not manually correct the error. The message field 365 also informs the user that this particular synchronization action 325 was not applied at the remote computing system.

The message field 365 can include other types of messages. For example, the message field 365 can be used to display messages that a particular synchronization action 310 was successfully carried out, or that corrective action was successful or unsuccessful in overcoming the synchronization error or failure.

For synchronization actions 310 that have errors or failures, the screen 300 may provide a user with options to attempt to resolve synchronization errors or failures by selecting a resolve icon 370, to discard the synchronization actions 310 by selecting a discard icon 375, or to retry synchronization actions 310 by selecting a refresh icon 380. By selecting the resolve icon 370, the user is presented with the original UI screen where the object type 315 of the synchronization action 310 was originally created, modified, or otherwise accessed. In some implementations, selecting the discard icon 375 removes the data associated with the selected synchronization action from the client device, and abort ceases attempts to synchronize the selected synchronization action with the remote computing system. For example, selection of the discard icon 375 may remove a new data object instance from the client device, or revert the data object instance of the client device to a prior version of the data object instance (such as a version stored on the remote computing system or a version of the client device prior to the UI manipulation actions associated with the synchronization action). In other examples, selecting the discard icon 375 does not remove data from the client device, but ceases attempts to synchronize the data with the remote computing system.

The refresh icon 380 may be useful, for example, when the synchronization error or failure is likely to be transient. For example, if a synchronization action 310 failed because the version of the data at the remote computing system was unavailable, the synchronization can be reattempted to determine whether the data has become available.

In other implementations, the screen 300 includes more, fewer, or different items than those shown.

Example 4—Example Synchronization Error Resolution Display Screen

FIG. 4 is an example UI screen 400 illustrating a conflict resolution process provided by an aspect of the present disclosure. According to this aspect, when a synchronization conflict or error is encountered, a user is able to see the conflict in the context (such as a UI screen) in which the user originally created or modified the data. The user may also be provided with the opportunity to resolve the error or conflict within the same context. In a particular example, the user is able to access the conflict resolution screen 400 from the synchronization log UI screen of FIG. 2, or the synchronization detail UI screen 300 of FIG. 3 (such as by selecting the resolve icon 370).

In FIG. 4, the conflict resolution screen 400 provides an example of resolving a conflict for a data object instance of the data object schema "appointment." However, the concepts discussed with respect to the screen 400 can be applied to other synchronization errors or conflicts, including data object instances of data object schemas other than appointments, or for types of synchronization conflicts or errors for the appointment data object schema other than this illustrative example.

The conflict resolution screen 400 provides a plurality of data fields 415 where a user may enter or modify data. The data fields 415 are prepopulated with the data in the version last viewed, accessed, created, or modified by the user, including any additions, deletions, or modifications made by the user to the local version of data. For example, the subject field 420 is prepopulated with "Meeting with new client," which, for a new appointment, would represent data entered by the user when the new appointment was created, or during a previous modification by the user. The priority field 425 and owner field 430 are similarly prepopulated.

The Start Date/Time field 435 and End Date/Time field 440 are also prepopulated. However, the fields 435, 440 are the source of the synchronization error. Specifically, the start date in field 435 is later than the end date in field 440. Optionally, the display 400 may include an indication to the user as to the source of the synchronization error or failure, such as missing or noncompliant data. For example, the fields 435, 440 are shown as being highlighted, but could be indicated as the source of the error in some other manner. For example, an error icon (not shown) could be displayed proximate the fields 435, 440. In particular implementations, the highlighting, or other indication, may be removed if the user corrects the synchronization conflict or error, such as by entering appropriate start and end times for the appointment. In other examples, the source of the synchronization conflict or error is not specifically identified to the user.

In addition to optionally indicating the data giving rise to the synchronization conflict or error, the screen 400 may include an error message 450 describing to the user the nature of the error or failure and/or suggesting corrective action. For example, error message 450 indicates that the appointment start date is later than the end date and the user should select a start date that is earlier than the end date. In some implementations, an icon 455 may be provided to display more information about the error or failure, including regarding possible corrective actions.

If desired, the user may edit (including adding or removing) data from other data fields 415, such as those not associated with the synchronization error. Once the user has edited the data, the user may save the appointment by selecting the save icon 460. At this point, additional UI manipulation actions specifying the corrections (and any other changes) may be initially handled at the client device and then sent to the remote computing system for "online" processing. Once the appointment has been saved, if the user has successfully resolved the synchronization error or conflict, the synchronization action status may be updated in the synchronization detail screen of FIG. 3, or the status of the overall synchronization event updated in the synchronization log screen of FIG. 2.

The user may also choose to discard the appointment by selecting the cancel icon 465.

Example 5—Synchronization Error Resolution Actions at a Client Device

Figure 5:
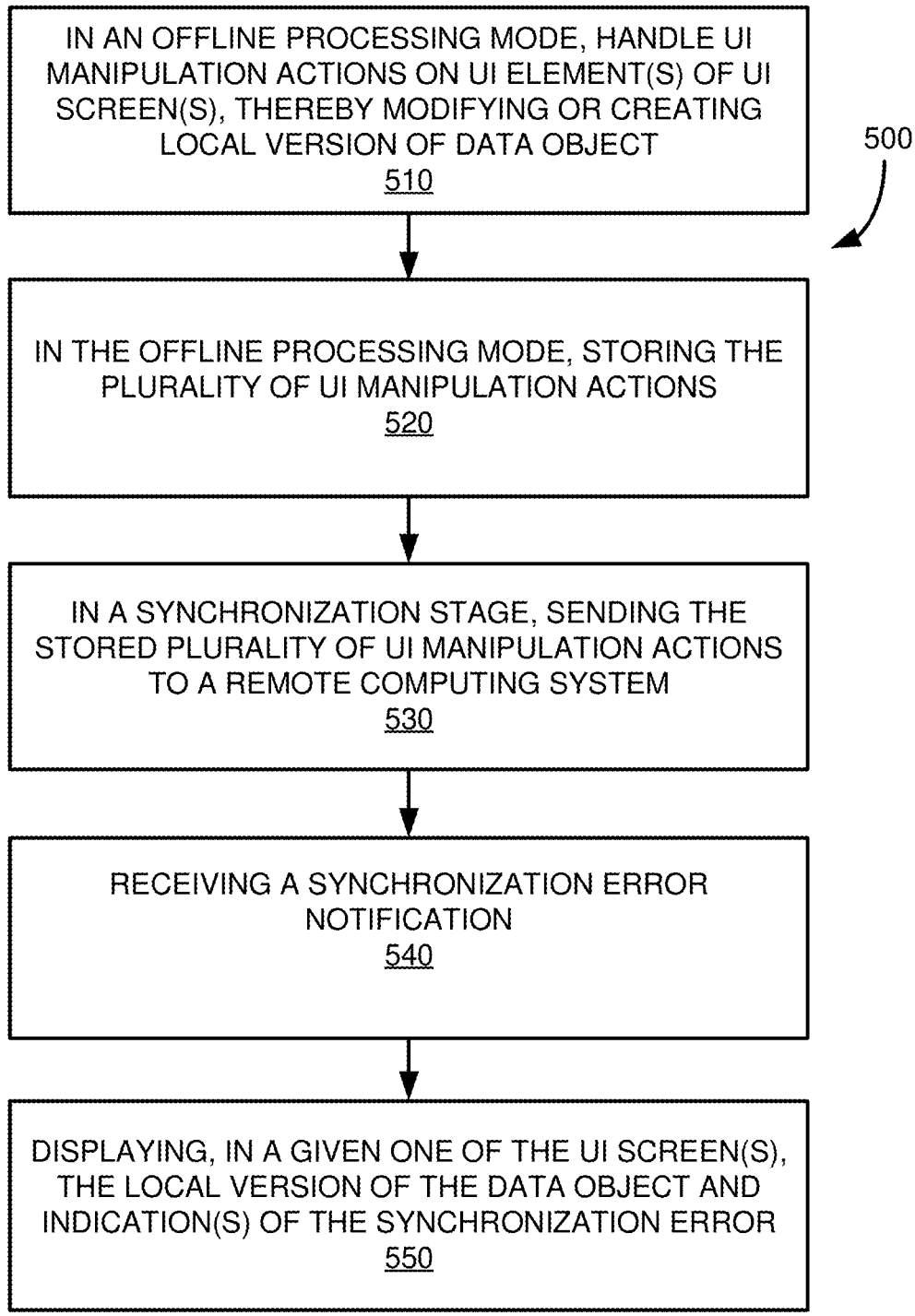
FIG. 5 is a flowchart of actions occurring at a client device and associated with resolving synchronization errors according to an embodiment of a synchronization protocol of the present disclosure.

FIG. 5 is a flowchart of an example method 500 of actions occurring at a client device associated with resolving synchronization errors occurring during synchronization with a remote computing system. Several of the actions of the method 500 occur at the client device in an offline processing mode— when the client device is not connected to a remote computing system.

In step 510, in an offline processing mode, the client device handles a plurality of user interface ("UI") manipulation actions on one or more UI elements of one or more UI screens. In some example implementations, the UI element(s) are specified with UI metadata stored on the client device. The handling of the plurality of UI manipulation actions modifies or creates a local version of a data object stored on the client device. The UI manipulation actions can indicate actuation, selection, or other manipulation of the one or more UI elements, as rendered with a UI engine at the client device. For example, the UI manipulation actions may include those actions that manipulate a UI element in order to modify or create a data object or metadata stored at the client device, such as data or metadata of a data object instance of a data object schema. The UI manipulation actions can include actions that manipulate a UI element to add or remove data or metadata. The UI manipulation actions can also include other types of UI manipulation actions, such as actions that indicate that a client application should take some action, for example, user navigation input (for example, changes windows or tabs in an application or browser) and UI manipulation actions to open, save, or close tables or files, or actions such as spell checking a document or sorting data.

In the offline processing mode, the plurality of UI manipulation actions are stored on the client device in step 520. In one implementation, the UI manipulation actions are stored when the client device is disconnected from the remote computing system. In some aspects of the method, the UI manipulation actions are recorded as they are received and handled, such as being stored as they are being handled at the client device. In some cases, the UI manipulation actions are stored in an order in which they were received, or handled, by the client device. In other cases, the UI manipulation actions may be stored in a different order, but with information sufficient to reconstitute the order in which the UI manipulation actions were received or handled, such as a time associated with the handling or receiving.

In a synchronization stage, the stored UI manipulation actions are sent to the remote computing system in step 530.

In step 540, the client device receives a synchronization error notification from the remote computing system. In some aspects, the synchronization error notification indicates a synchronization error between the local version of the data object and a remote version, if any, of the data object stored on the remote computing system. In other aspects, the synchronization error notification indicates a synchronization error associated with the UI manipulation actions, which may also relate to a synchronization error between the local version of the data object and a remote version, if any, of the data object stored on the remote computing system.

The synchronization error notification can indicate, for example, that the UI manipulation actions produce data in an improper format (such as not complying with rules of a data schema, or omitting required data of the schema), that changes made by the UI manipulation actions conflict with prior changes made to data stored at the remote computing system (e.g., prior changes made by another user), or that required data (such as a version of the data to be modified by UI manipulation actions) is not available at the remote computing system, such as being locked for modification by another user, or marked as unmodifiable by the remote computing system, such as in response to commands from a system administrator or other authorized user.

In step 550, the client device displays, in a given one of the one or more UI screens, the local version of the data object and one or more indications of the synchronization error. For example, the given UI screen may present data as added, removed, or modified by the plurality of stored UI manipulation actions.

The method 500 may include additional steps. In particular, after the UI screen including the local version of the data object and indication(s) of the synchronization error is displayed by the client device, the client device may handle one or more additional UI manipulation actions, wherein the handling of the additional UI manipulation action(s) modifies the local version of the data object stored on the client device to address the synchronization error notification. For example, a user may provide one or more UI manipulation actions, such as entering data to correct the synchronization error, to retry the synchronization, or to abort synchronization of particular data. The additional UI manipulation action(s) may be transmitted to the remote computing system.

In further implementations, the indication(s) of the synchronization error can take various forms. For example, data, or a data field, may be highlighted, or an icon displayed, to provide a visual indication to the user as to the source of the synchronization error. The UI screen including the indication(s) of the synchronization error may also include a synchronization error message. The synchronization error message may include, for example, information identifying the synchronization error or suggesting action to correct the synchronization error.

The method 500, in another implementation, includes displaying a synchronization summary screen, which includes information related to the synchronization error. The synchronization summary screen may show, for example, a synchronization log, such as a log that indicates the status of one or more synchronization events with the remote computing system. The status may indicate that a synchronization event was completed, was completed (or partially completed) with errors, failed, is pending, or is in process. A synchronization summary screen may also be provided that displays information regarding one or more particular synchronization events, such as the synchronization status of individual synchronization actions attempted during a synchronization event. For example, the status may be completed, failed, pending, or in process. If the synchronization of a particular synchronization action failed, or had an error, the synchronization summary screen may provide one or more options (such as by providing a corresponding selectable icon) that may be taken regarding the synchronization action, such as retrying the synchronization action, aborting the synchronization action, or attempting to resolve the synchronization failure or error. In particular implementations, if the user elects to attempt to resolve the synchronization failure or error, step 550 (displaying the UI screen including the local version of the data object and indication(s) of the synchronization error) may be carried out.

Figure 6:
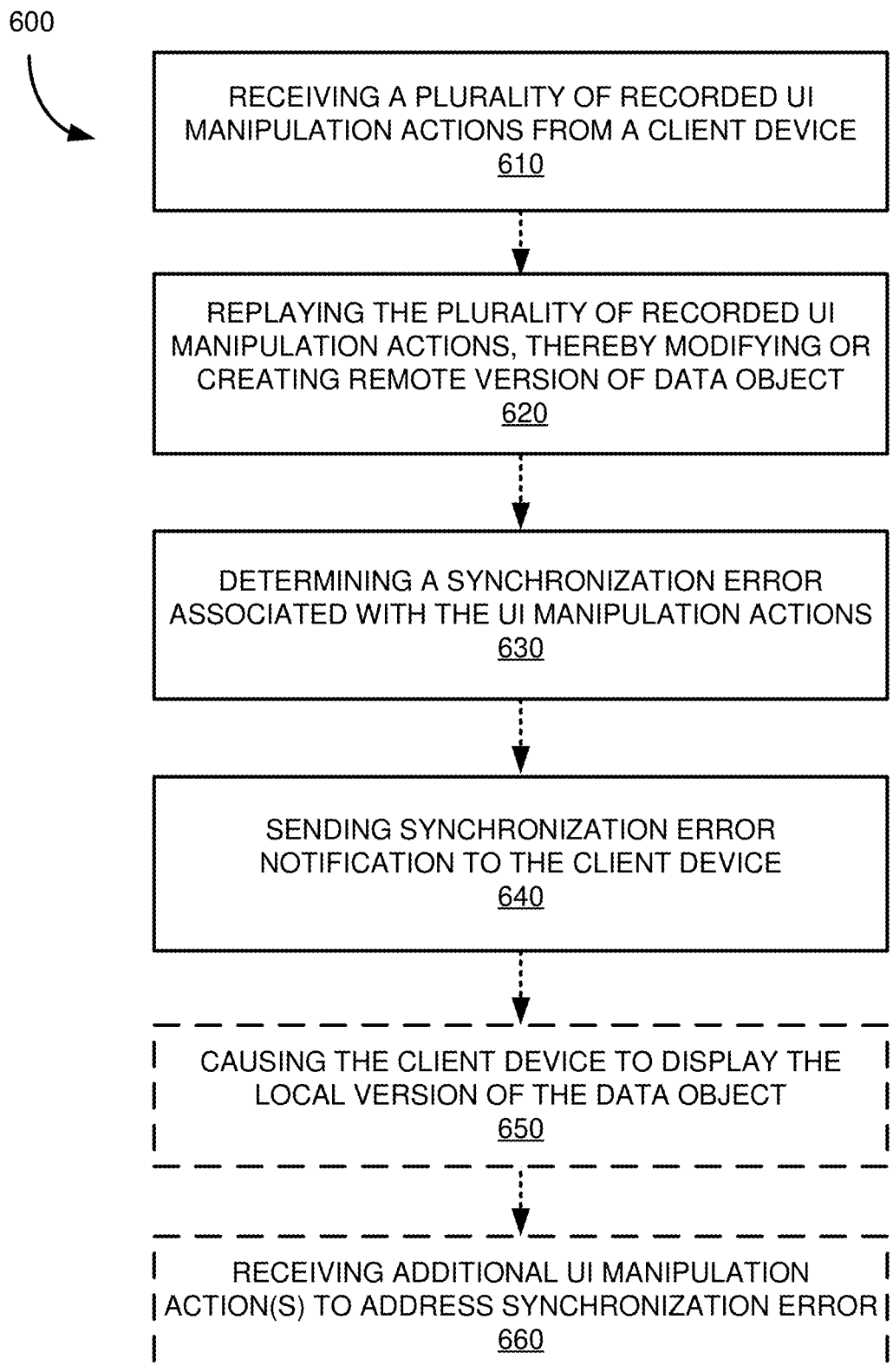
FIG. 6 is a flowchart of actions occurring at a remote computing system and associated with resolving synchronization errors according to an embodiment of a synchronization protocol of the present disclosure.

Example 6—Synchronization Error Resolution Actions at a Remote Computing System FIG. 6 is a flowchart of an example method 600 of actions occurring at a remote computing system associated with resolving synchronization errors occurring during synchronization with a client device.

In step 610, the remote computing system receives from the client device a plurality of recorded UI manipulation actions. The UI manipulation actions implement a modification or creation of a local version of a data object stored on the client device in an offline processing mode. Step 610 can include providing a notification to the client device that the stored UI manipulation actions were received by the remote computing system. In some examples, the recorded UI manipulation actions are received (and stored at the remote computing system) in an order in which they occurred at the client device. In other examples, the recorded UI manipulation actions may be received (and stored) in a different order, but include information sufficient to reconstitute the order in which they occurred at the client device, such as a time each UI manipulation action occurred. The UI manipulation actions can indicate actuation, selection, or other manipulation of one or more UI elements, as rendered with a UI engine at the client device. In some example implementations, the UI element(s) are specified with UI metadata stored on the client device and also on the remote computing system.

The recorded UI manipulation actions are replayed at the remote computing system in step 620, such as in the same order in which the recorded UI manipulation actions were carried out at the client device. The replay modifies or creates a remote version of the data object, for storage on the remote computing system.

In step 630, the remote computing system determines a synchronization error associated with the UI manipulation actions. For example, the remote computing system may determine that the remote version of the data object, to which the UI manipulation actions are to be applied, is locked or otherwise unavailable for synchronization, determine that the UI manipulation actions conflict with the remote version of the data object, e.g., due to changes made by another user, or determine that the UI manipulation actions would produce a version that failed to comply with one or more rules, such as lacking data or having improperly formatted data. Typically, the synchronization error is determined after the UI manipulation actions are replayed. In some implementations, however, the synchronization error is determined before the UI manipulation actions are replayed.

A synchronization error notification is sent to the client device in step 640. The synchronization error notification may include, or be accompanied by, for example, an error message to be displayed to a user. The error message may include information regarding the source of the synchronization error or suggested corrective action. The synchronization error notification may also include, or by accompanied by, data regarding the local version of the data object. For example, the synchronization error notification may include data to be processed by the client device, to be used to display the local version of the data object to a user in a UI screen of the client device. The synchronization error notification may include information to highlight the source of the synchronization error in the local version of the data object displayed to the user in the UI screen of the client device. The method 600 can include one or both of the optional steps of sending the local version of the data object to the user and causing the client device to display the local version of the data object, including, optionally, highlighting the source of the synchronization error in the displayed local version of the data object, or otherwise visually indicating the source of the synchronization error in the UI screen of the client device.

The method 600 can include additional steps. For example, the method 600 can include receiving one or more additional UI manipulation actions from the client device, where the additional UI manipulation action(s) correct the synchronization error. The method 600 can further include replaying the additional UI manipulation action(s) to modify the remote version of the data object. The corrected remote version of the data object, such as a corrected data object instance, can be stored on the remote computing system.

Figure 7:
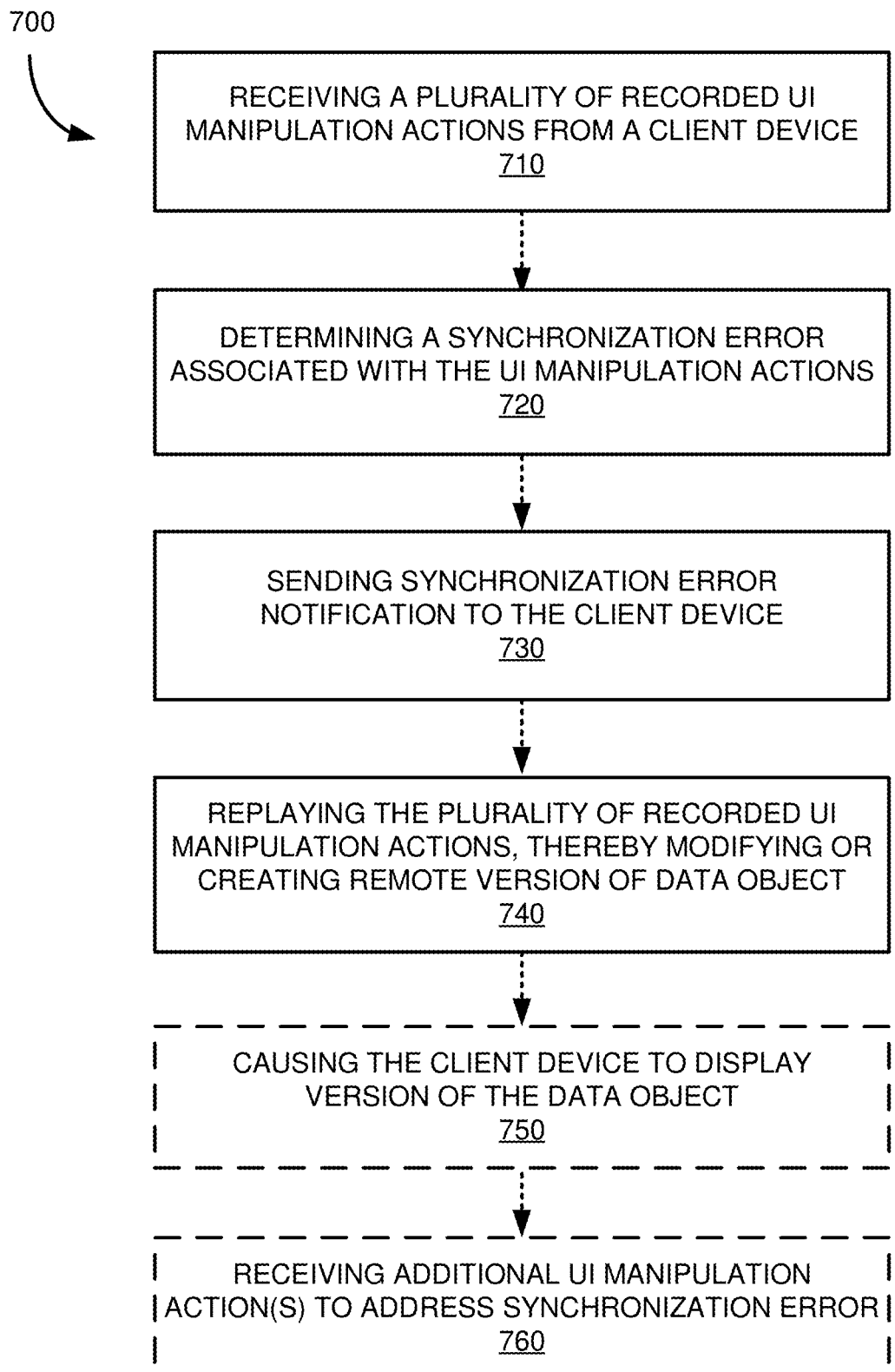
FIG. 7 is a flowchart of actions occurring at a remote computing system and associated with resolving synchronization errors according to an embodiment of a synchronization protocol of the present disclosure.

FIG. 7 is a flowchart of another example method 700 of actions occurring at a remote computing system associated with resolving synchronization errors occurring during synchronization with a client device.

In step 710, the remote computing system receives from the client device a plurality of recorded UI manipulation actions. Step 710 is analogous to step 610 of FIG. 6.

In step 720, the remote computing system determines a synchronization error associated with the plurality of UI manipulation actions. For example, the remote computing system may determine that the remote version of the data object (at the remote computing system), which is needed to be accessed to carry out the plurality of UI manipulation actions, is locked or otherwise unavailable. The remote computing system may also determine that the UI manipulation actions would produce a version that does not comply with data rules, such as lacking required data or having improperly formatted data. In some implementations of the method 700, in carrying out step 720, the remote computing system may replay the recorded UI manipulation actions on a version of the data object stored at the remote computing system. Although step 720 is shown as occurring after step 710, in other implementations of the method 700, step 720 occurs before step 710.

The remote computing system sends a synchronization error notification to the client device in step 730, which may be analogous to step 640 of FIG. 6. Although step 730 is shown as occurring after step 710, in other implementations of the method 700, step 730 occurs before step 710. For example, steps 720 and 730 may be carried out before step 710.

In step 740, the plurality of recorded UI manipulation actions are replayed at the remote computing system. The replaying can modify or create a remote version of the data object, for storage on the remote computing system. For example, the recorded UI manipulation actions can be applied to a remote version of the data object stored on the remote computing system. In at least some implementations, step 740 is analogous to step 620 of FIG. 6. Although shown as occurring after step 730, in other implementations of the method 700, step 740 is carried out in a different order. For example, step 740 may be carried out prior to step 730, in which case sending synchronization error notification to the client device in step 730 can include sending information to the client device regarding the local version of the data object (stored at the client device). Step 740 may also be carried out as part of one of the other steps of the method 700, such as in determining the synchronization error in step 720. However, in particular examples, the replay of the recorded UI manipulation actions may occur more than one time. For example, the replay may occur in step 720 and again in step 740.

In certain implementations, step 740 may be carried out in response to user input. For example, the user may provide an instruction to attempt to resolve the synchronization error, which may result in the performance of step 740.

The method 700 can include additional steps. For example, in optional step 750, the remote computing system may cause the client device to display the version of the data object produced by the replaying of the UI manipulation actions on the remote computing system in step 740. In optional step 760, the remote computing system receives one or more additional UI manipulation actions from the client device. For example, the additional UI manipulation action(s) may indicate how to correct the synchronization error. The additional UI manipulation actions may be replayed to produce a corrected version of the data object, which may then be stored by the remote computing system.

Example 8—Representative Computing Environment

Figure 8:
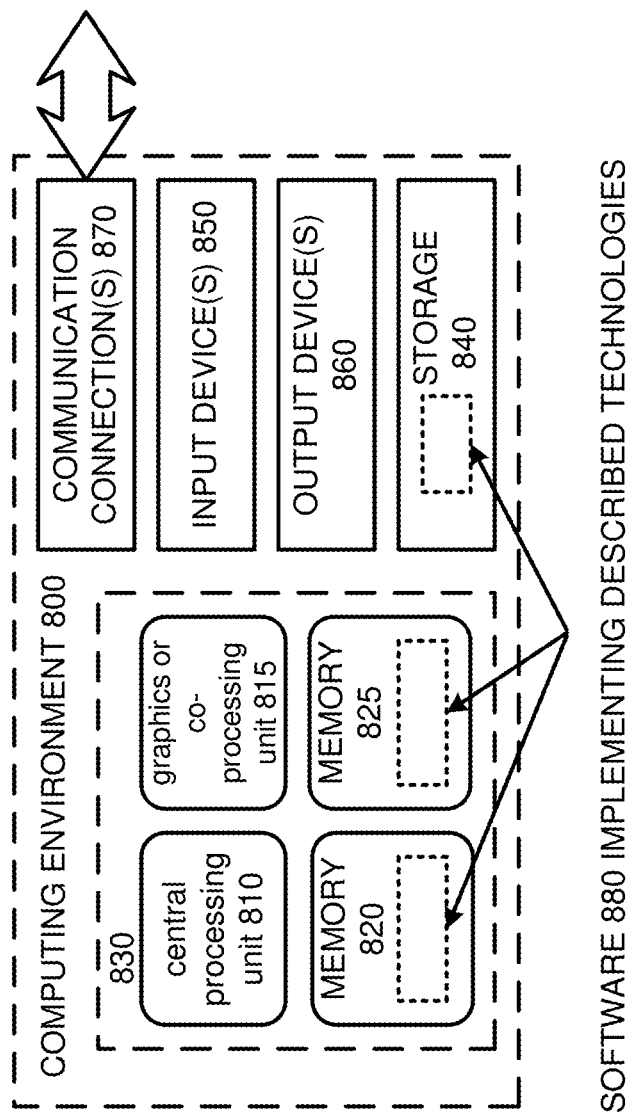
FIG. 8 is a diagram of an example computing system in which described embodiments can be implemented.

FIG. 8 depicts a generalized example of a suitable computing environment (e.g., computing system) 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer(s), tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity, which may also be configured as described in this Example 8. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable media does not include communication connections, such as signals and carrier waves. Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language, or, in some examples, markup languages such as HTML or XML, or combinations of suitable programming languages and markup languages. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Example 9—Cloud-Supported Environment

Figure 9:
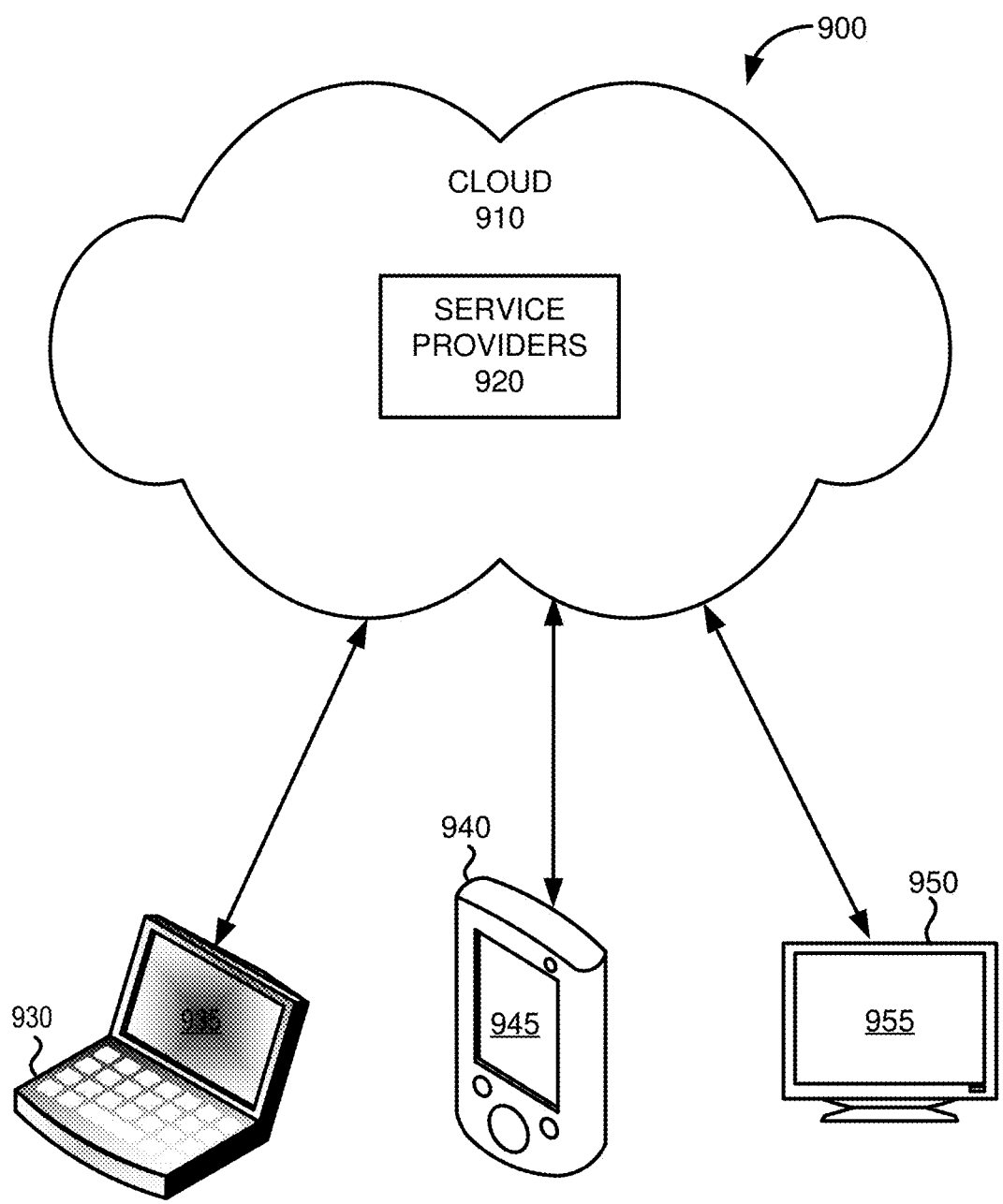
FIG. 9 is an example cloud-support environment that can be used in conjunction with the technologies described herein.

FIG. 9 is an example cloud-support environment that can be used in conjunction with the technologies described herein. In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through cloud service providers 920, or through other providers of online services (not depicted). For example, cloud services can be customized to the screen size, display capability, and/or touch screen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of computing languages, including programming languages, markup languages, or combinations thereof.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. One or more non-transitory computer-readable media comprising:
computer-executable instructions that, when executed by a computing system comprising at least one hardware processor and at least one memory coupled to the at least one hardware processor, cause the computing system to, in an offline processing mode, handle a plurality of user interface ("UI") manipulation actions on one or more UI elements of one or more UI screens, wherein the plurality of UI manipulation actions indicate actuation, selection, or other manipulation of the one or more UI elements, and wherein the client device is not connected to a remote computing system in the offline processing mode;
computer-executable instructions that, when executed by the computing system, cause the computing system to, in the offline processing mode, store the plurality of UI manipulation actions;
computer-executable instructions that, when executed by the computing system, cause the computing system to, in a synchronization stage, send the stored plurality of UI manipulation actions to the remote computing system to be carried out again by the remote computing system;
computer-executable instructions that, when executed by the computing system, cause the computing system to, receive a synchronization error notification from the remote computing system, the synchronization error notification indicating a synchronization error associated with the carrying out of the UI manipulation actions at the remote computing system.

2. The one or more non-transitory computer-readable media of claim 1, further comprising:
computer-executable instructions that, when executed by the computing system, cause the computing system to, after receiving the synchronization error notification, display, in one of the one or more UI screens, a local version of the data object and one or more indications of the synchronization error, wherein the one or more indications include a synchronization error message suggesting action to resolve the synchronization error.

3. The one or more non-transitory computer-readable media of claim 2, further comprising:
computer-executable instructions that, when executed by the computing system, cause the computing system to handle one or more additional UI manipulation actions, wherein the handling the one or more additional UI manipulation actions modifies the local version of the data object stored on the client device to address the synchronization error notification.

4. The one or more non-transitory computer-readable media of claim 3, further comprising:
computer-executable instructions that, when executed by the computing system, cause the computing system to send the one or more additional UI manipulation actions to the remote computing system.

5. The one or more non-transitory computer-readable media of claim 2, further comprising:
computer-executable instructions that, when executed by the computing system, cause the computing system to display a synchronization summary screen, the synchronization summary screen including information related to the synchronization error.

6. The one or more non-transitory computer-readable media of claim 1, wherein the plurality of UI manipulation actions are stored in an order in which they occurred or are stored with information sufficient to reconstitute the order.

7. The one or more non-transitory computer-readable media of claim 1, wherein a local version of the data object is not sent to the remote computing system in the synchronization stage.

8. A method, implemented in a remote computing system comprising at least one hardware processor and at least one memory coupled to the at least one hardware processor, the method comprising:
receiving a plurality of recorded user interface ("UI") manipulation actions from a client device, wherein the recorded UI manipulation actions are programmatically generated by the client device using a UI engine or application event handler, the UI engine transforming user interactions into structured action records that identify target UI elements, action types, and execution order metadata, and wherein the recorded UI manipulation actions indicate actuation, selection, or other manipulation of one or more UI elements rendered at the client device in an offline processing mode, wherein the client device is not connected to the remote computing system in the offline processing mode;
storing the plurality of recorded UI manipulation actions in an action store of the remote computing system;
re-playing the plurality of recorded UI manipulation actions by carrying out the same UI manipulation actions at the remote computing system, wherein the replay comprises invoking application-level behavior at the remote computing system based on the structured content of each recorded UI manipulation action, and wherein the re-playing of the plurality of recorded UI manipulation actions at the remote computing system modifies or creates a remote version;
determining a synchronization error associated with the UI manipulation actions; and
sending a synchronization error notification to the client device, the synchronization error notification indicating that one or more recorded UI manipulation actions failed to replay correctly at the remote computing system wherein the synchronization error notification is processable by the client device to trigger a user interface update indicating the synchronization error.

9. The method of claim 8, further comprising:
sending a synchronization error notification to the client device.

10. The method of claim 9, further comprising:
receiving one or more additional UI manipulation actions from the client device; and
executing the one or more additional UI manipulation actions to modify the remote version of the data object.

11. The method of claim 9, further comprising:
sending data regarding the local version of the data object to the client device, wherein the data comprises a data field associated with the synchronization error.

12. The method of claim 8, wherein the remote computing system does not receive a local version of the data object from the client device when receiving the plurality of recorded UI manipulation actions.

13. The method of claim 9, wherein the synchronization error notification comprises a description of the synchronization error to be displayed in a UI screen of the client device.

14. The method of claim 8, wherein the recorded UI manipulation actions are stored in an order in which they occurred at the client device and the re-playing carries out the UI manipulation actions in the same order in which they occurred at the client device.

15. The method of claim 9, wherein the synchronization error notification comprises information on how to remedy the synchronization error.

16. A computing system that implements a synchronization service, the computing system comprising:
one or more memories;
one or more processing units coupled to the one or more memories; and
one or more computer readable storage media storing instructions that, when executed, cause the computing system to perform operations comprising:
storing in an action store a plurality of user interface ("UI") manipulation actions received from a client device during synchronization with the client device, wherein the recorded UI manipulation actions are programmatically generated by the client device using a UI engine or application event handler, the UI engine transforming user interactions into structured action records that identify target UI elements, action types, and execution order metadata, and wherein the client device is not connected to the computing system in the offline processing mode;
executing instructions that implement synchronization, the synchronization re-playing the UI manipulation actions stored in the memory by carrying out the same UI manipulation actions at the computing system, wherein the re-playing of the stored UI manipulation actions comprises invoking application-level behavior at the remote computing system based on the structured content of each recorded UI manipulation action and modifies or creates a remote version of the local version of the data object;
determining a synchronization error associated with the UI manipulation actions; and
sending a synchronization error notification to the client device, the synchronization error notification indicating that one or more recorded UI manipulation actions failed to replay correctly at the remote computing system wherein the synchronization error notification is processable by the client device to trigger a user interface update indicating the synchronization error.

17. The computing system of claim 16, the operations further comprising:
producing a synchronization error notification to be sent to the client device, wherein the synchronization error causes the client device to display the local version of the data object and one or more indications of the synchronization error.

18. The computing system of claim 17, the operations further comprising:
receiving one or more additional UI manipulation actions and execute the one or more additional UI manipulation actions to modify the remote version of the data object.

19. The computing system of claim 16, wherein the stored UI manipulation actions are re-played in an order in which they occurred at the client device.

20. The computing system of claim 16, wherein the computing system does not receive a local version of the data object when receiving the plurality of recorded UI manipulation actions during synchronization with the client device.

* * * * *